(12) United States Patent
Cutshaw

(10) Patent No.: US 6,416,204 B1
(45) Date of Patent: Jul. 9, 2002

(54) ILLUMINABLE REFRACTIVE ILLUSIONAL SURFACE

(76) Inventor: Dale Lee Cutshaw, 1012 Carlton Blvd., Jackson, MI (US) 49203

( * ) Notice: Subject to any disclaimer, the term of this patent is extended or adjusted under 35 U.S.C. 154(b) by 0 days.

(21) Appl. No.: 09/451,019

(22) Filed: Nov. 29, 1999

(51) Int. Cl.$^7$ ................................................. F21V 5/00
(52) U.S. Cl. ...................... 362/326; 362/331; 362/812; 40/443
(58) Field of Search ................................ 362/330, 331, 362/326, 812; 40/541, 547, 564, 443

(56) References Cited

U.S. PATENT DOCUMENTS

| | | | | |
|---|---|---|---|---|
| 1,834,066 A | * | 1/1931 | Litic | 40/443 |
| 1,990,825 A | * | 2/1935 | Hodgkin | 40/443 |
| 3,991,552 A | | 11/1976 | Ho | 58/4 A |
| 4,141,058 A | | 2/1979 | Mizohata | 362/32 |
| 4,417,411 A | * | 11/1983 | Miyagishima et al. | 40/443 |
| 4,613,929 A | * | 9/1986 | Totten | 362/150 |
| 4,807,092 A | | 2/1989 | Hasegawa | 362/32 |
| 4,975,807 A | * | 12/1990 | Ohashi | 362/23 |
| 5,277,952 A | | 1/1994 | Watras | 428/46 |
| 5,447,760 A | | 9/1995 | Watras | 428/13 |
| 5,820,246 A | * | 10/1998 | Helstern | 362/84 |
| 5,820,251 A | | 10/1998 | Greenberg | 362/227 |
| 5,944,862 A | | 8/1999 | Howes | 65/60.3 |
| 5,951,138 A | | 9/1999 | Ishikawa | 362/31 |
| 5,995,456 A | | 11/1999 | Brewer | 368/84 |
| 6,158,156 A | * | 12/2000 | Patrick | 40/443 |

OTHER PUBLICATIONS

Twinkle Tree Jan. 1994 DoDo Sales Inc. Copyright.

* cited by examiner

Primary Examiner—Alan Cariaso
Assistant Examiner—John Anthony Ward

(57) ABSTRACT

A predetermined number of light sources (14) are positioned such that the light sources (14) positions illuminate patterns which are concealed by the refractive substrate (16) when not luminous. When luminous the lighted patterns can be observed through the refractive substrate (16). The refractive substrate (16) is arranged to create patterns and when the light sources (14) are not luminous the refractive substrate (16) exhibits a resplendent display unaccompanied.

14 Claims, 3 Drawing Sheets

ILLUMINABLE REFRACTIVE ILLUSIONAL SURFACE

CROSS-REFERENCE TO RELATED PATENTS

Not applicable.

BACKGROUND—STATEMENT REGARDING FEDERALLY SPONSORED RESEARCH OR DEVELOPMENT

Not applicable.

BACKGROUND—FIELD OF INVENTION

This invention relates to illumination, specifically to illuminable surfaces that can be used for decorative, advertising and displaying purposes.

BACKGROUND—DESCRIPTION OF PRIOR ART

Displaying surfaces have been used for many number of reasons. Some are used for advertising or presenting while others are used in decorating.

Optical decoration system such as U.S. Pat. No. 4,807,092 issued to Hasegawa (1989) discloses a system that uses fiber optics. This type of system requires a separate container to house the light source and also needs a cable network of fiber optics to transmit the light to the actual surface. This results in having two separate apparatus to accommodate the invention as well as a means to conduct the light between them. U.S. Pat. No. 4,141,058 issued to Mizohata (1979) uses a similar device. Although the receiving surface of both these inventions are composed of different materials, the concept is the same. The light from the light source needs to be conducted via optical fibers to its destination point. However, in both cases, when the light source is not in operation the invention becomes ineffective.

U.S. Pat. No. 4,807,092 uses shattered glass particles but they are only used to create a uniform brightness of emitted light on the surface. When the source light is not luminous these shattered glass particles become ineffective. Neither of these types of devices give a solution to how the system can still be effective when the light sources are not luminous.

U.S. Pat. No. 5,820,251 issued to Greenburgh (1998) uses light sources in patterns. However, they are used only to illuminate a surface already made with a pattern. In this invention, a pattern is positioned and light sources protrude in the shape of the pattern. The lights are used to illuminate the device during dark periods but are visible while they project during lighted periods. This device is used only to illuminate the surface during darkness. The pattern is still observable but the light sources are still noticeable and unsightly.

Refractive particles such as broken glass and have been used in the past in the bottom of fish tanks. The idea is to create a sparkle effect in lieu of rocks and pebbles. These particles are supposed to add a glitter impression to the already sparkling water. However, during their use they lose their luster and must be cleaned continuously.

Digital watch displays are used to display time. The numbers are displayed and their sources positions are concealed. Yet, when the numbers are no longer luminous the watch become useless. The display unit simply becomes a blank, unusable surface.

Stained glass designs have also been used for many years. Although it shows unique, artistic patterns, it is always fixed in the same pattern. There are no means to conceal its projections nor change its patterns. It has only one facet.

All of these objects have drawbacks that are specific to each type. Some have cumbersome apparatus while others, when not operable, become useless articles. Most only serve one purpose and show only one facet.

SUMMARY

This invention is a lighted surface that comprises a number of light sources. When luminous they project light onto a refractive substrate viewable through a transparent support member. The lights, when luminous allow specified patterns to emerge. When the light sources are not luminous only the refractive substrate is viewable and serves as a visual display in its own right.

OBJECTS AND ADVANTAGES

Accordingly, several objects and advantages of my surface are:

(a) the ability to not need an outside light source because all of the specified number of light sources can be incorporated into the surface itself.

(b) the ability to be positioned on just about anything that has a suitable surface.

(c) my invention eliminates the need to have a cumbersome light source on a separate apparatus as well as a surplus of fiber optic cables extending to the display unit.

(d) the ability to contain lighted patterns that add to the luster of the exhibit.

(e) the ability for the refractive substrate to conceal the specified light sources and non-luminous patterns to provide the impression of only the refractive substrate while giving off a glitter appearance in its own right promotes my inventions distinction.

(f) when the refractive substrate is arranged by color or shimmer the image becomes more spectacular.

(g) it is easy to attain materials to manufacture.

(h) some of the refractive substrates such as broken glass are inexpensive and sometimes even free.

(i) the ability to use once discarded materials such as broken glass in a useable manner.

(j) it is easy to construct.

(k) the ability to use light not embodied within the invention to illuminate the refractive substrate and patterns allows the invention to be utilized in situations where illumination is not practical or not needed.

(l) the versatility of my surface is not limited to only one surface on one object. It is designed to be used for several types of objects and surfaces and even unaccompanied.

(m) it allows a greater artistic license by broadening the range of potential designs due to its several optical facets.

Further objects and advantages of my surface are the multifaceted embodiments of the surface. Its capacity to be implemented in several material surfaces allows greater diversity in the presentation of my surface. Increased visual flexibility at relatively minimal expense allows for greater marketability of the product.

DRAWING FIGURES

REFERENCE NUMERALS IN DRAWINGS

12 Colored pattern
13 Light sources
16 Refractive substrate
18 Transparent support member
20 Light Barrier
22 Non-transparent support member

DESCRIPTION

Figure 3:
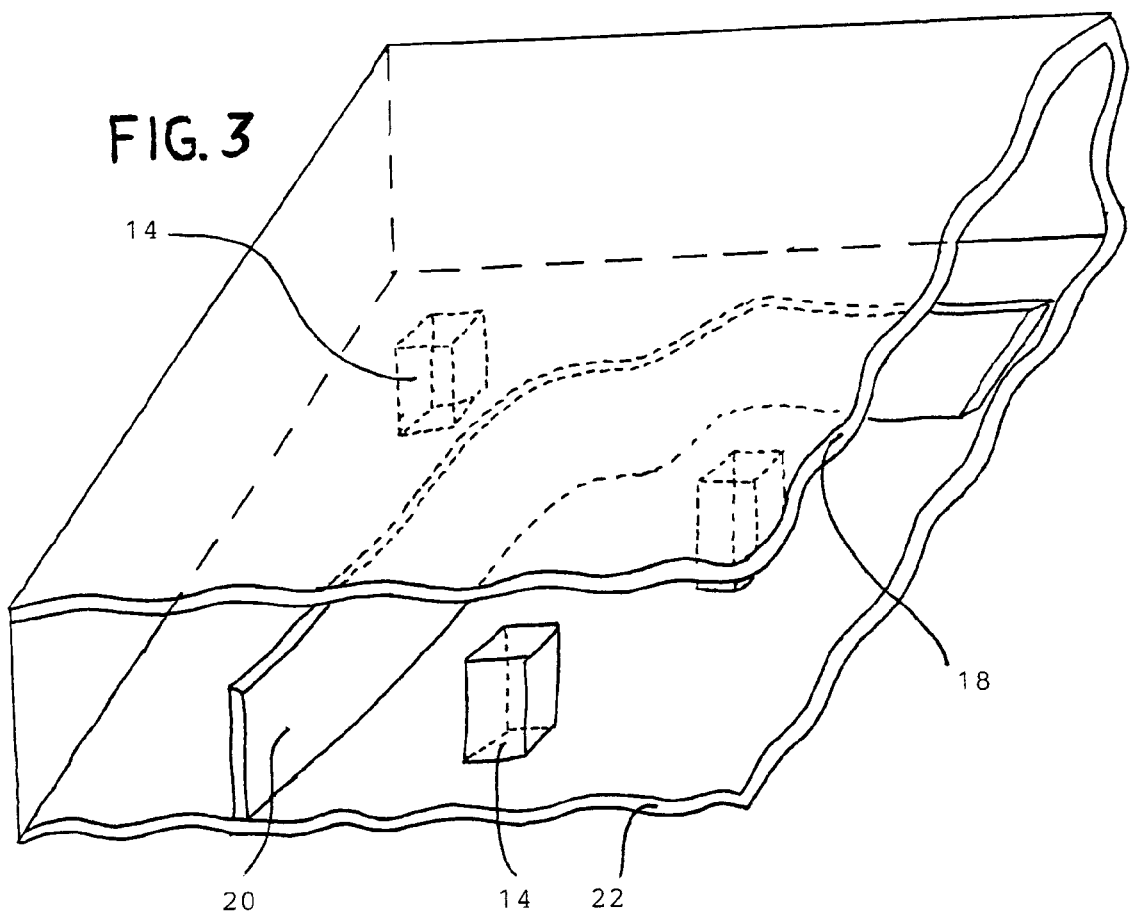
FIG. 3 shows a preferred embodiment looking through a transparent support member toward the refractive substrate with the invention at a gradient to obtain a perspective viewpoint of the internal nomenclature.
Figure 4:
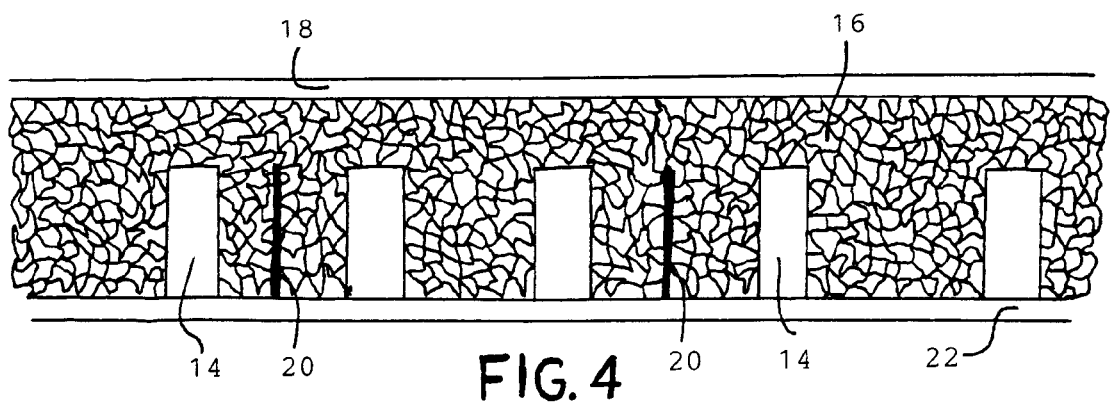
FIG. 4 shows a preferred embodiment of the invention through the side to view the location of the components internal orientations.

FIGS. 3 and 4—Preferred Embodiment

A preferred embodiment of the surface in the present invention is illustrated in FIG. 4 (side view). In this embodiment a refractive substrate 16 is comprised of broken glass particles because of their availability. However, the refractive substrate 16 can consist of any substance that has the ability to refract light and conceal the internal components. Particles such as, plastic beads, marbles, quartz crystals, other rock crystals and even on the extreme expensive side such as diamonds can also be used. These are only a few examples of the preferred substances for substrate 16. Due to the advancements of plastics in recent years, other possible materials for substrate 16 are almost endless.

The means to support substrate 16 is made of a rigid material. This material can consist a rigid transparent surface plate. The transparent support member 18 generally consists of glass because its readily available and easy to access. In the past few years more advancements have been made in the production of clear solid plastics. Thus, the means to support substrate 16 can consist of anything that is transparent and will support it, such as, glass, plexi-glass, and a multitude of different compositions of plastics. Even clear adhesives can be used to support substrate 16.

Only one side of refractive substrate 16 needs to be covered with transparent support member 18 so that substrate 16 can be viewed. The opposing side can then be covered with non-transparent materials. The non-transparent support member 22 includes anything that can support substrate 16 in a favorable position. It can consist of wood, metal, hard plastics, and adhesives. All these materials as well as others can perform the job.

In the preferred embodiment, as seen in FIGS. 3 and 4, only one aspect of substrate 16 is supported by transparent support member 18 while the others are not. As long as substrate 16 can be viewed at some angle it remains effective. FIG. 3 is drawn without substrate 16 so that the reader can gain a better perspective of the positioning of the other internal components. Non-transparent support member 22 is generally less costly and easier to attain than transparent support member 16.

The light sources 14 that are positioned such that refractive substrate 16 conceals them generally consists of a multitude of light bulbs. Although there several types of sources that can be used, the most preferred are those that resemble string type lights. Some of the other types of light sources 14 can consist of, LEDs (light emitting diodes), incandescent lights, neon lights and florescent lights. Due to the superabundant amount of differing types of bulbs, naming them all here would be unimaginable.

Light barriers 20 are placed around light sources 14 and must also remain concealed by substrate 16. Many different materials can be used in this situation. Any material that can be formed and molded with relative ease and still be able to block and focus the light from light sources 14 can be used. The materials include, plastic strips, metal strips, and if worked properly, wood can even be used.

Overall, light sources 14 are positioned onto non-transparent support member 22 and fixed in patterns. Light barriers 20 are placed around light sources 14 and refractive substrate 16 is placed over light sources 14. Placing transparent support member 18 on top of refractive substrate 16 completes this embodiment of my invention.

FIGS. 1A, 1B, 3, 4—Operation Preferred Embodiment

Figure 1A:
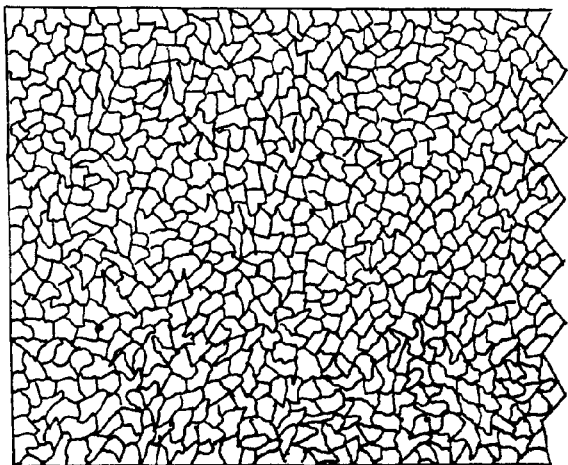
FIG. 1A shows a preferred embodiment looking through a transparent support member toward the refractive substrate.
Figure 1B:
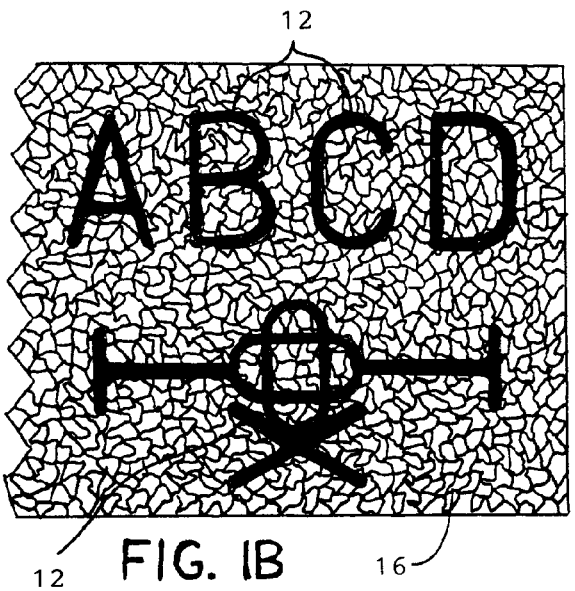
FIG. 1B shows a preferred embodiment looking through a transparent support member toward the refractive substrate with the predetermined number of light sources illuminated.

The operation of the preferred embodiment of the surface of the present invention is illustrated in FIG. 1A and FIG. 1B. The light sources 14 positions are not visible when not luminous as seen in FIG. 1A. However, when light sources 14 are luminous as seen in FIG. 1B, only the light from light sources 14 is visible. Refractive substrate 16 is able to conceal light sources 14 as well as the other components contained within the invention. Substrate 16 gives my invention the ability to accomplish this phenomenon. Substrate 16, because of its particles shapes, utilizes this ability to bend and refract incoming light to create this illusion. This bending of the light also allows for a more even distribution of the light emitted from light sources 14 when they are luminous, seen in FIG. 1B.

Non-transparent support member 22 is used to hold refractive substrate 16 in position as seen in FIGS. 3 and 4. Non-transparent support member 22 is also used to hold light sources 14 in position when they are imbedded within substrate 16 viewed more closely in FIG. 4.

To create a more precise lighted pattern definition, light barriers 20 must be placed bordering light sources 14. This prohibits uncontrollable light diffusion within refractive substrate 16 and allows for an accurate light exhibit. The light barriers 20 locations are also obscured by substrate 16 when light sources 14 are not luminous. When light sources 14 are illuminated light barriers 20 placement can only be determined by the precise termination of light diffusion within refractive substrate 16.

A supporting means of a transparent support member 18 is placed opposite non-transparent support member 22 to lock substrate 16 into position. This allows my surface to be displayed at different angles and allow substrate 16 to be viewed. The supporting members 18 and 22 also help substrate 16 remain protected from outside disturbances.

When different portions of light sources 14 are luminous at different times, they allow for more than one design to be implemented. Many designs can be fashioned into position within the same surface and viewed at different occasions.

When light sources 14 are not luminous only refractive substrate 16 is viewable. Using outside light, substrate 16 shows its unique appearance unparalleled.

Figure 2:
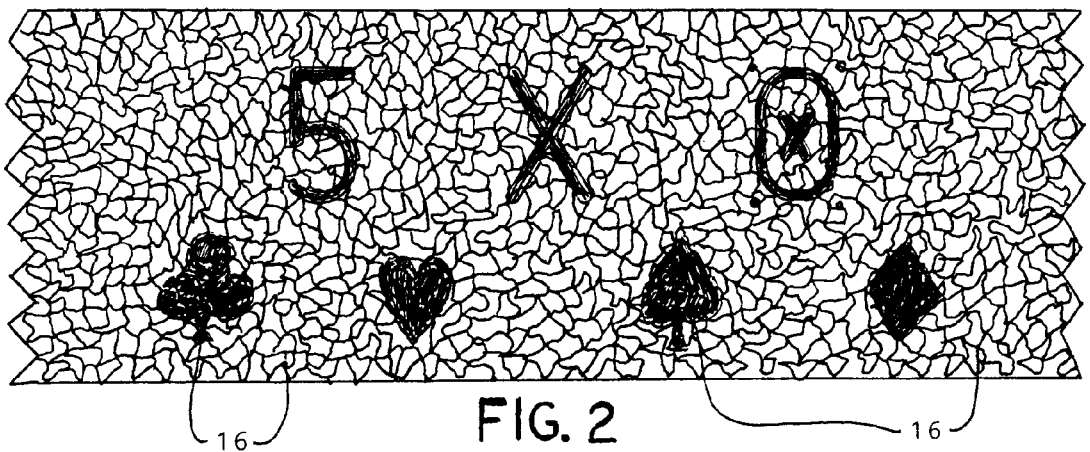
FIG. 2 shows an additional embodiment looking through a transparent support member toward the refractive substrate with the refractive substrate organized into a specified design.

FIG. 2—Description of Additional Embodiment

In this embodiment, as seen in FIG. 2, substrate 16 is organized by color to create patterns. All aspects of this embodiment work the same as in the preferred embodiment except refractive substrate 16 comprises a mixture of colors. It is still able to refract outside light and allow for a unique display on its own.

FIG. 2—Operation of Additional Embodiments

Operation of the additional embodiments are shown in FIG. 2. However, in this case, refractive substrate 16 is organized by color and is arranged to produce specified patterns. Substrate 16, in this illustration, carries out the same role as it does in the operation of the preferred embodiment as seen in FIGS. 1A and 1B. It still conceals light sources 14 and light barrier 20 but allows for a distinguishable design to remain viewable when light sources 14 are not in operation.

Light sources 14 can be used to illuminate the pattern of substrate 16 when desired so that in either form of the exhibit can be displayed. The design will be the same except the difference is that one is illuminated and the other is not.

With the correct combination of light sources 14 to refractive substrate 16 in both color and brightness an entirely new pattern can be formed between the lighted and non-lighted forms of this embodiment. Accomplishment of this function is by using brighter lights with a more clear colored refractive substrate 16.

So when light sources 14 are luminous, they display a specific pattern. However, when light sources 14 are no longer in use and substrate 16 stands on its own. A completely new design is now expressed. Thus allowing different designs to be implemented in either case.

Figure 5A:
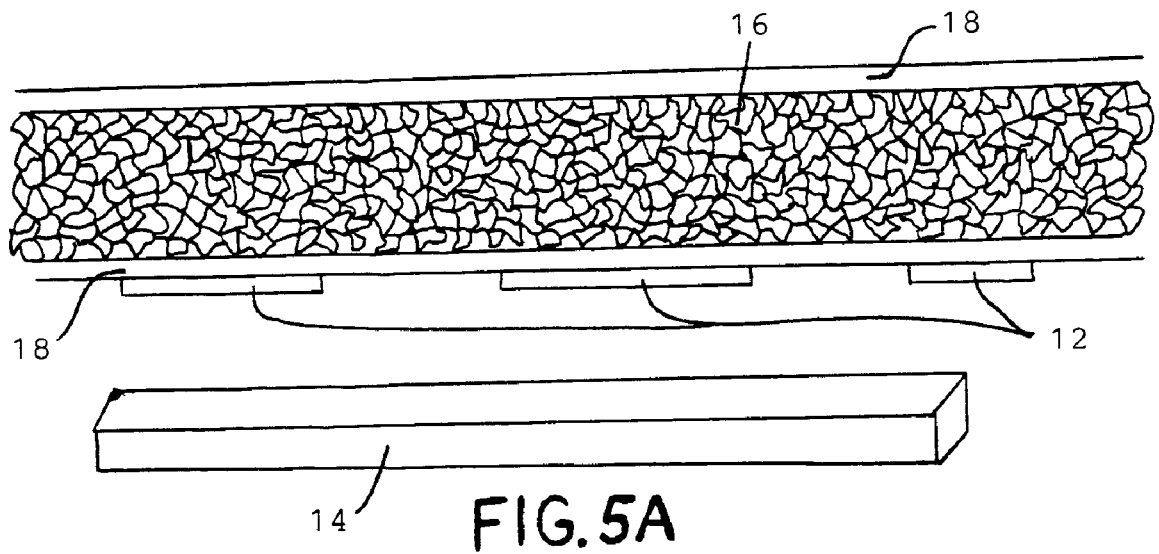
FIG. 5A shows an alternative embodiment of the invention through the side to view a different aspect of the internal components in a different configuration.
Figure 5B:
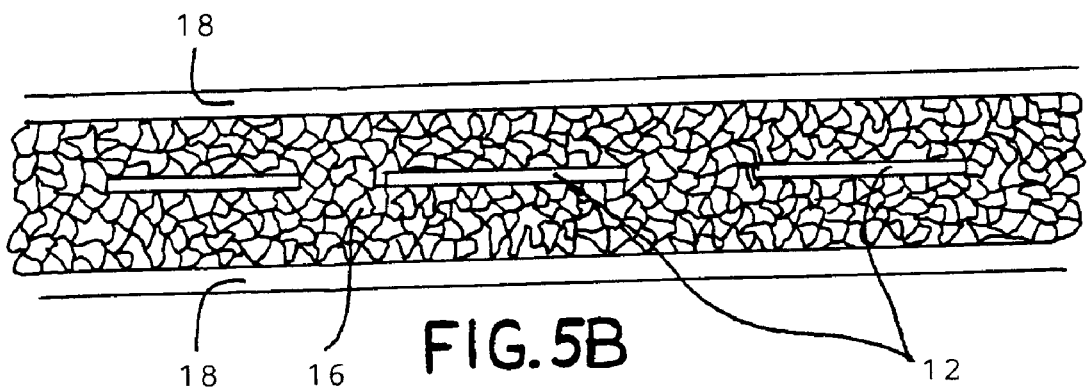
FIG. 5B shows an alternative embodiment of the invention through the side to view a different aspect of the internal components in a different configuration.

FIGS. 5A and 5B—Description of Alternative Embodiments

As the reader can see, the configuration of the nomenclature of the internal components need not be the same as in FIGS. 3 or 4 to produce the same effect. Light sources 14 do not need to be imbedded within substrate 16 in order to remain concealed as seen in FIGS. 5A and 5B. Light sources 14 are utilized outside substrate 16 in this embodiment.

Generally in this alternate embodiment, substrate 16 is organized in patterns and display images while using outside light to illuminate it. Since light sources 14 are not imbedded within substrate 16 this allows for the use of a colored filter 12 to be implemented. As long as substrate 16 conceals the colored filters 12, the same effect can be accomplished.

In FIG. 5A, light from light sources 14 passes through colored filter 12 then through transparent support member 18 and then through substrate 16. Colored filter 12 does not need to be used in this embodiment for it to be effective. Light sources 14 can still be utilized as patterns here. However, when transparent support member 18 encompasses substrate 16, colored filter 12 is more practical.

Seen in FIG. 5B, colored filter 12 is covered at all angles by substrate 16 and transparent support members 18. The light source 14 most used in this embodiment is outside light sources such as the sun (not included). Light source 14 passes through one aspect of substrate 16 then through colored filter 12 before passing through the rest of substrate 16.

In FIG. 5B, colored filter 12 is imbedded within refractive substrate 16 covered by transparent support members 18. FIG. 5B only shows one manner in which colored filter 12 can be positioned in my surface.

FIGS. 1A, 1B, and 2—Operation of Alternate Embodiment

Displaying this aspect permits the invention to implement outside light in its operation. Light from the sun, moon, other natural light and even light from artificial sources provides adequate illumination and accomplishes an equivalent result. This embodiment it is an effective means for display. Generally, in this alternate embodiment, substrate 16 is organized in patterns and display images while using outside light to illuminate it.

With the invention is in this configuration it allows for the surface to be viewed from any side of substrate 16. As long as the outside area of substrate 16 is not compromised by loss of concealment of internal components, the final effect is the same. This occurs when the means for supporting refractive substrate 16 at every angle are comprised of transparent support members 18.

This embodiment is used for larger outdoor projects. Because ambient and natural light is mainly used for this facet the need for artificial light is generally not needed. This in no way states that artificial light can not be used to illuminate my surface. Simply, the use of light sources 14 are not needed.

Even though the configuration of the internal components have changed from each embodiment, the over all effect has not, as seen in FIGS. 1A, 1B, and 2.

CONCLUSIONS, RAMIFICATIONS, SCOPE

Thus, the reader will see that my refractive surface is extremely multifaceted and can be placed on any object that can support it. Because the refractive substrate gives my invention its uniqueness added with my inventions additional, alternate embodiments and functions, it can be used for more than just a single embodied displaying device.

It can portray the light sources and decorative patterns and used to illuminate the refractive substrate. Also included is the ability to still be utilized when the light sources are not luminous. It is used for refracting natural or artificial light. As a different aspect of display, the refractive particles give a brilliant, glittering appearance without the aid of a light source that is used in conjunction with my invention. By using natural light sources, outside artificial light sources and ambient or reflected light, the refractive substrate gives off a very distinct, visually pleasing appearance. Additionally, when the substrate is arranged by color to create specified patterns, the array is even more spectacular. Furthermore, lighted patters can be displayed to give an additional appearance to the already spectacular display.

Numerous colors of the refractive substrate being mixed together gives off an unparalleled appearance as well as one solid color or organized colors would.

As the reader can see, there are several combinations that can be reached according to the taste or results desired. Due to the many facets and embodiments, the possibilities and combinations are almost endless. Having the refractive particles or lights, mixed, solid, or sequenced or any combination thereof, along with the infinite number of designs possible is staggering.

My surface allows the use of refractive particles such as broken glass to be implemented in a significant, expressive manner instead of simply being disposed of. Although using broken glass fragments is generally a more cost effective means for the refractive substrate, many other materials can be used.

While my above description encompasses many provisions, these should not be interpreted as restrictions on the extent of my surface, but rather as a representation of a few preferred embodiments thereof.

Accordingly, the extent of my invention should be measured not by the embodiments represented, but by the appended claims and their legal equivalents.

I claim:

1. A means for creating an illuminable refractive illusional surface comprising:

(1) a substrate composed of refractive particles that refract and reflect light (2) a means to illuminate said substrate positioned so that when said means to illuminate is not luminous the substrate conceals the means to illuminate allowing the substrate to maintain a functional exhibit, and (3) a means to support the substrate in a favorable position.

2. The illuminable refractive illusional surface in claim 1 wherein the means to illuminate the patterns are comprised of elements selected from the group of illuminated objects such as LED's and incandescent lights and are arranged in particular designs and positioned such that when the means to illuminate becomes luminous a sufficient amount of light can be radiated onto the substrate.

3. The illuminable refractive illusional surface in claim 1 wherein the means to illuminate the patterns are bounded by barriers so that the radiated light can be blocked to prevent uncontrolled diffusion and create more precise light pattern definition.

4. The illuminable refractive illusional surface in claim 1 wherein colored filters are used to alter the color of and block the light emitted by the means to illuminate to create specified patterns and designs while still being concealed by the substrate.

5. The illuminable refractive illusional surface in claim 1 wherein said means to support the substrate are thin smooth rigid transparent plates selected from the group of transparent plates such as glass and synthetic resins with the substrate positioned between them.

6. The illuminable refractive illusional surface in claim 1 wherein the substrate is comprised of elements selected from the group of refractive particles such as broken glass and plastic beads and the particles are from 0.2 cm to 4.0 cm in size and remains a functional exhibit solitary without the application of the means to illuminate.

7. The substrate in claim 6 wherein the refractive particles are arranged to create specific patterns.

8. An illuminable refractive illusional surface comprising:

(1) a predetermined number of light sources that are concealed by (2) a substrate comprised of refractive particles that refract and reflect light such that the light given off by said light sources is diffusely refracted by and viewable through said substrate and when the light sources are not luminous the substrate conceals the locations of the light sources and the substrate acts as a useful design alone and (3) a means to support the substrate in a favorable position.

9. The illuminable refractive illusional surface in claim 8 wherein the light sources are comprised of elements selected from the group of illuminated objects such as LED's and incandescent lights and are assorted in patterns and positioned such that when the sources are illuminated an ample amount of light can be emitted onto the substrate that is observable through said means to support the substrate.

10. The illuminable refractive illusional surface in claim 8 wherein the light emitted from the light sources is confined by opaque enclosures to limit refraction of erratic light to sustain more explicit design boundaries.

11. The illuminable refractive illusional surface in claim 8 further including colored filters that are used to change the tone of and obstruct the light given off by the light sources to establish designated figures and designs and still remain concealed by the substrate.

12. The illuminable refractive illusional surface in claim 8 wherein the means to support the substrate is a transparent material such as an optically clear adhesive that will hold the substrate in an established location.

13. The illuminable refractive illusional surface in claim 8 wherein the substrate is chosen from the classification of refractive particles such as broken glass and plastic beads and the particles are from 0.2 cm to 4.0 cm in size and remains a functional exhibit alone without the use of the means to illuminate.

14. The substrate in claim 13 wherein the refractive particles are sorted by color to produce specific patterns.

* * * * *

UNITED STATES PATENT AND TRADEMARK OFFICE
CERTIFICATE OF CORRECTION

PATENT NO.   : 6,416,204 B1                                          Page 1 of 1
DATED        : July 9, 2002
INVENTOR(S)  : Dale L. Cutshaw It is certified that error appears in the above-identified patent and that said Letters Patent is hereby corrected as shown below:

Column 3,
Line 25, change the reference number of the Light Sources from the number 13 to the number 14.

Signed and Sealed this

Twenty-eighth Day of January, 2003

JAMES E. ROGAN
*Director of the United States Patent and Trademark Office*